M. A. PATTERSON.
TOASTER.
APPLICATION FILED FEB. 16, 1909.
947,549. Patented Jan. 25, 1910.
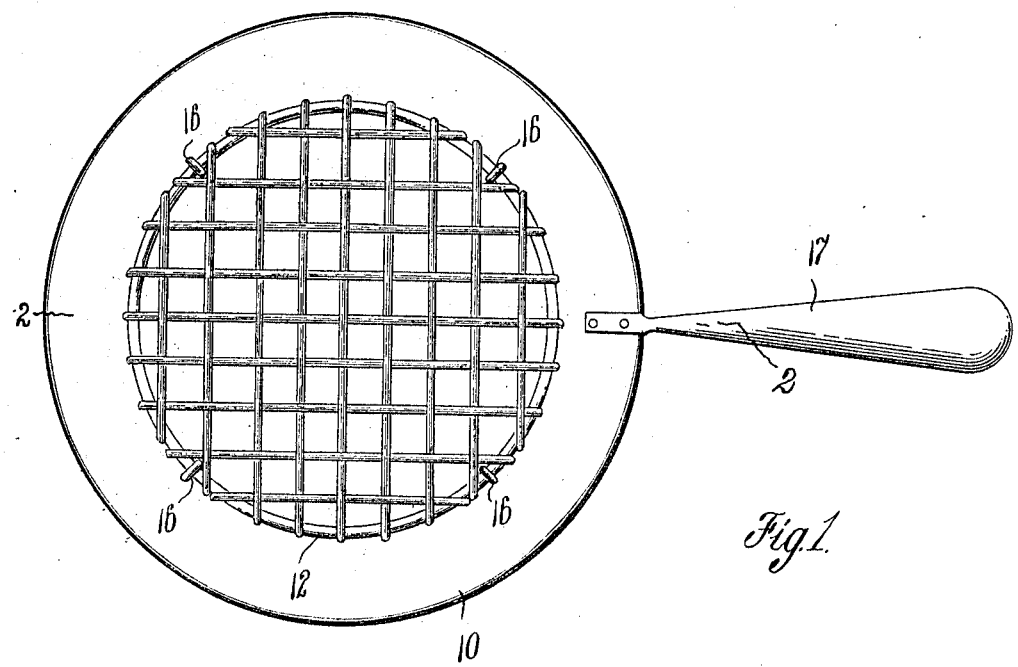
Fig. 1.
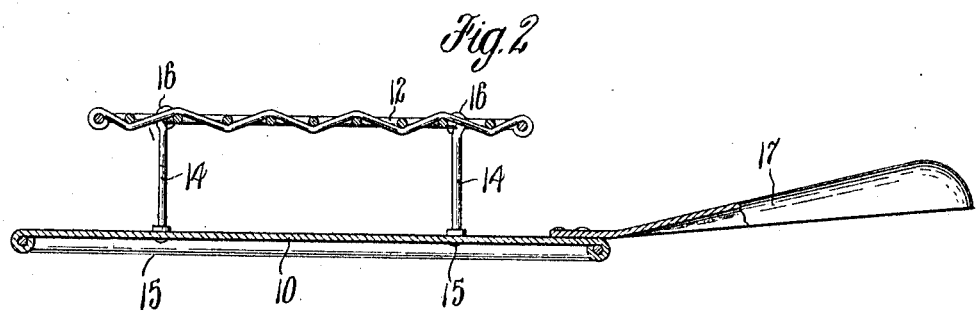
Fig. 2.
Fig. 3.
Witnesses
J. H. Crawford
C. N. Woodward
Inventor
Margaret A. Patterson,
By Chandler & Chandler
Attorneys

UNITED STATES PATENT OFFICE.

MARGARET A. PATTERSON, OF ENGLEWOOD, NEW JERSEY.

TOASTER.

947,549.     Specification of Letters Patent.     Patented Jan. 25, 1910.

Application filed February 16, 1909. Serial No. 478,193.

*To all whom it may concern:*

Be it known that I, MARGARET A. PATTERSON, a citizen of the United States, residing at Englewood, in the county of Bergen, State of New Jersey, have invented certain new and useful Improvements in Toasters; and I do hereby declare the following to be a full, clear, and exact description of the invention, such as will enable others skilled in the art to which it appertains to make and use the same.

This invention relates to utensils for toasting bread, more particularly to utensils of this character employed in connection with gas and similar stoves, to protect the bread from the direct influence of the gas flame, and has for one of its objects to simplify and improve the construction and increase the efficiency and utility.

With this and other objects in view, the invention consists generally in a disk or plate of imperforate material, such as sheet metal, and a disk or plate of foraminous material, such as woven wire, and supported above the imperforate disk, the imperforate disk being preferably larger in diameter than the foraminous disk.

The invention further consists in certain novel features of construction as hereafter shown and described and then specifically pointed out in the claim, and the drawings illustrative of the preferred embodiment of the invention.

Figure 1 is a plan view of the improved device. Fig. 2 is a section on the line 2—2 of Fig. 1. Fig. 3 is a sectional detail illustrating a modified form of the rim of the disk.

The improved device comprises an imperforate disk or plate 10, preferably in circular form and of sheet metal, and preferably provided with a binding wire in the rim as shown in Fig. 2, or with the rim turned over as shown in Fig. 3. The disk 10 is designed to be arranged over the burner of a gas stove, and will be large enough to project at all sides beyond the burner so that the flame therefrom will not pass around the edges of the plate.

Located above the plate 10 is a foraminous plate or disk preferably formed of an annular wire hoop or ring 12 united by a plurality of crossed wires connected at the ends to the member 12. The member 12 with its crossed wires is supported above the plate 10 by a plurality of standards 14, the standards being preferably riveted at their lower ends through the plate 10 as shown at 15, and with eyes 16 at their upper ends engaged around the member 12.

The disk 10 is provided with a suitable handle 17.

The disk 10 being considerably larger than the foraminous member, the flame from the gas burner will not reach the slices of bread disposed on the latter consequently the product will not be scorched by direct contact with the flames. The bread will thus be maintained in position to receive the full benefit of the heat without danger of injury therefrom.

The improved device is simple in construction, can be inexpensively manufactured and of any suitable material and of any suitable size.

What I claim is:—

A device of the class described comprising a disk of imperforate material, a member of foraminous construction of less area than the imperforate disk, and supporting means between the disk and the foraminous structure and supporting the same spaced above the disk, whereby an annular imperforate surface is maintained around the foraminous structure and guarding the material supported upon the foraminous structure from the direct action of the heating medium.

In testimony whereof, I affix my signature, in presence of two witnesses.

MARGARET A. PATTERSON.

Witnesses:
    GEO. H. PAYSON,
    ETHEL B. TAYLOR.